UNITED STATES PATENT OFFICE.

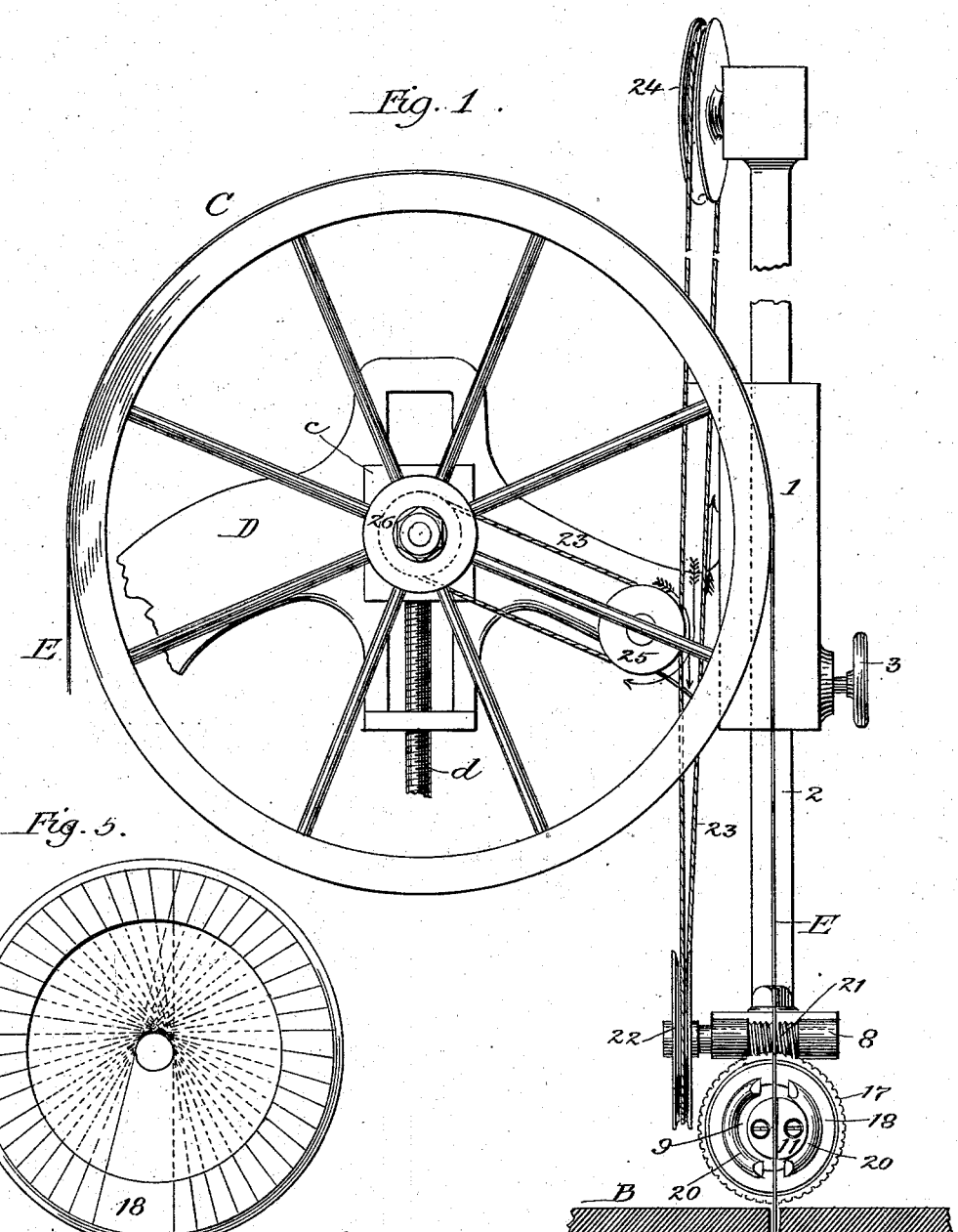

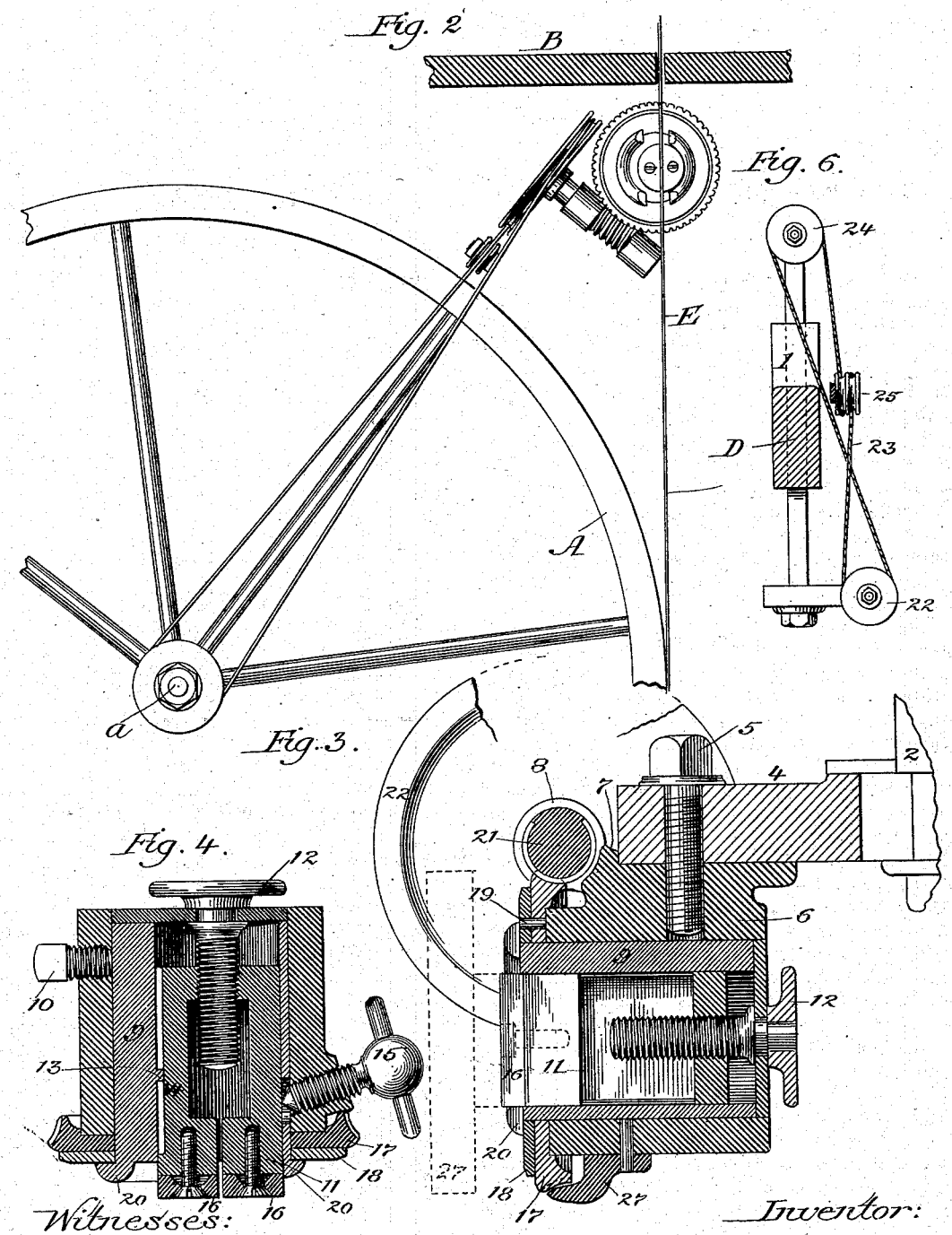

REUBEN McCHESNEY, OF FRANKFORT, NEW YORK, ASSIGNOR TO HALL & BROWN, OF ST. LOUIS, MISSOURI.

BAND-SAW GUIDE.

SPECIFICATION forming part of Letters Patent No. 276,259, dated April 24, 1883.

Application filed November 20, 1882. (No model.)

*To all whom it may concern:*

Be it known that I, REUBEN McCHESNEY, a citizen of the United States, residing in Frankfort, in the county of Herkimer and State of New York, have invented certain new and useful Improvements in Band-Saw Machines, of which the following is a specification.

My invention relates to band-saw machines in which saw-guides are arranged above and below or on each side of the operative point of the saw, so as to maintain the saw in a straight line and from a lateral or wavering movement, which saw-guides have a back plate, against which the smooth back edge of the saw is held, and over which the saw travels.

The objects of my invention are to provide means for adjusting one of the saw-guides toward or from the other, to accommodate the guides to thick and thin lumber, as the case may be, so as to attain the greatest possible effect of the guides upon the saw whether the lumber be of greater or less thickness; to provide for the adjustment of the jaws of the guide toward or from each other, so that while the saw may be free to travel between the jaws there will be no excess of space when thinner blades are used, and on the other hand the jaws be adapted for operation upon differing thicknesses of saw-blades; to provide a saw-guide the jaws of which may be adjusted at a right angle to the length or line of travel of the blade through the jaws to accommodate said jaws to and permit their successful operation upon saw-blades materially differing in width; to provide means for automatically actuating the back plate of a saw-guide, so that the bearing and friction of the saw will be continually shifted to different points or surfaces of the back plate, and hence prevent the saw from wearing grooves in and radiating from the axis of the plate, as the saw would if the line of travel of the saw were through the axis of the plate and the plate were only revolved at intervals; to provide such a relative arrangement of the back plate and jaws of a saw-guide as will cause the line of travel of the saw over the plate to describe on the plate radiating lines crossing each other, by reason of which the grooving of the back plate by the saw-blade is effectually prevented; to provide means for connecting the automatically-actuated back plate with power mechanism, so that the adjustable guide may be adjusted without requiring any adjustment of the connecting mechanism of the back plate with the power mechanism; and, finally, to provide certain novel details of construction, hereinafter fully described. I attain these objects by devices illustrated in the accompanying drawings, in which—

Figure 1 is a detail front elevation of a band-saw machine embodying my invention; Fig. 2, a similar view, showing the non-adjustable saw-guide arranged under the table, and the mechanism for actuating said guide and the saw-blade; Fig. 3, a vertical longitudinal section through the center of the saw-guide; Fig. 4, a horizontal section of the same; Fig. 5, a front elevation of the back plate with lines indicating the path of the saw upon said plate when the several parts of my machine are in operation; and Fig. 6, a detail side elevation of my machine, showing the arrangement of the mechanism connecting the saw-guide back plate with the power mechanism.

Similar letters and numerals of reference indicate the same parts in the several figures of the drawings.

Referring to Fig. 2, A represents the drive-band-saw wheel keyed upon a shaft, $a$, and actuated by any suitable means to give the band-saw the desired rate of speed.

Mounted above the wheel A and above the table B is a band-saw wheel, C, the bearing of which is in a journal-box, $c$, confined and vertically adjustable in a slotted but rigid frame or bracket, D, the adjustment of the journal-box being attained by a screw-threaded rod, $d$, operating in the bracket, and bearing at its upper end against and supporting said box. Wheel C derives its power from the band-saw E, which in turn derives its power from the wheel A, the adjustment of the wheel C serving to give the band-saw the desired tension for that purpose, and for the further purpose of adjusting the wheels to the band-saw as it becomes shortened by brazing after breaking as they frequently do. Bracket D extends laterally over the operating-table B, and has cast therewith or otherwise secured a head, 1, longitudinally perforated to form a bearing for a vertically-adjustable shaft, 2, held, when adjusted, by a thumb-screw, 3, passing through the head 1 and impinging against the shaft.

To the lower end of the shaft 2 is secured, at a right angle thereto, a plate, 4, to which in turn is secured, by means of a set-screw, 5, the saw-guide. (See Fig. 3.) The end of shaft 2 is squared, and is provided with a shoulder and nut, between which plate 4 is confined, and is adjustable toward and from the saw by reason of the elongation of the slot through which the shaft projects, this adjustment providing for advancing the saw-guide forward as the saw-band wheels become worn and correspondingly diminished in diameter.

A lateral adjustment of the saw-guide may be made, owing to the elongation of the slot of plate 4 in which screw 5 operates; but as the elongations and consequent adjustment of the parts are not of my invention they are not shown, and only described to demonstrate their adaptability to my particular devices.

The operative parts of the saw-guide are confined and supported by a hollow cylindrical housing, 6, clamped to the plate 4 by the screw 5, and provided with a shoulder or flange, 7, fitting against the front edge of plate 4, so as to prevent the housing from turning when operating the screw, and to render the housing rigid when the guide is in operation, said flange terminating in a bearing, 8, for a worm-screw, hereinafter described.

Confined by and bearing in the housing is a perforated cylindrical bushing, 9, the axis of which perforation is eccentric to the axis of the bushing, or, in other words, the perforation is formed in and nearer one side of the bushing than the other, as clearly shown in Fig. 4. This bushing may be rotated upon its own axis or reciprocated in the housing, and is held in the position to which it is adjusted by a thumb-screw, 10, passing through the walls of the housing and impinging against the walls of the bushing. The perforation in the bushing receives the jaws 11 11 of the saw-guide, which jaws, when taken together, form the outline of a cylinder cored out at its center, split at one end to form the jaws, and perforated at its opposite end to receive a thumb-screw, 12, free to turn, but not reciprocate in the bushing 9, and thereby reciprocate the jaws, which are prevented from having an axial movement by an internal stud, 13, engaging with a longitudinal groove, 14, in one of the jaws. Constructing the jaws in this manner gives them a spring action, so that when released from the pressure of a thumb-screw, 15, working in the housing and projecting through the bushing, they will spring apart, and on the other hand may be moved toward each other to adapt them for effectively guiding band-saws differing in thickness. The shanks of the jaws being more rigid than their ends has the effect of converging the inner faces of the jaws toward their ends, at which points the jaws are faced with steel plates 16 16, which are better capable of standing without wear the friction of the saw, and which dispense with the necessity of tempering the entire body of the jaws, and provide by their removability and reversibility against the necessity of renewing the jaws when worn, if the plates were omitted.

Plates 16 16 are secured to the jaws by countersunk set-screws, the countersinking of which renders the ends of the jaws plain, so that no surface is presented against which the saw E can catch as it travels between the jaws.

Converging the inner faces of the jaws, as above described, directs the wear of the saw against the steel plates, and not the body of the jaws, and effectually prevents the saw from crowding toward its rear edge between the jaws, and, furthermore, provides for a more accurate adjustment of the jaws to the thinner gage of saws; but of course the jaws or their inner faces may be constructed so as to move parallel to each other, instead of as above described, without substantially departing from the spirit of my invention. The longitudinal adjustment of the jaws renders them effective guides upon saws varying in width—that is to say, the jaws may be adjusted so as to confine the entire width of saw-blades differing in width without projecting forward of the teeth of the saw.

Referring to Fig. 4, it will be seen that if a medium width saw-blade were between the jaws and the points of the teeth were flush with the ends of the jaws, the blade could have no lateral movement; but if a wider blade were inserted without moving the jaws outwardly, the projecting portion of the blade would not be effected by the guide; hence would have an unsteady movement. So, on the other hand, a narrow blade could not operate between the tempered faces of the guide, nor could it be so nicely adjusted if the jaws extended any considerable distance beyond the teeth.

Bearing upon the forward end of the housing 6 and the bushing 9 is an annular worm-gear wheel, 17, faced with an annular back-plate, 18, of steel, glass, nickle, or other hard substance joined to the wheel by a pin, 19, so as to revolve with the wheel, the joint between the plate and the bushing 9 being covered by segmental ribs 20, (see Figs. 1 and 4,) which ribs serve as shoulders for the back plate to run against, and, as nearly as practicable, to prevent dust, &c., from creeping in said joint, but which are necessarily separated, so as to permit the back of the saw to bear against plate 18, which is the back plate of the saw-guide.

Gear 17 is engaged by a worm, 21, journaled in the bearing 8, and having keyed on its projecting end a sheave, 22, actuated by a cord or belt, 23, which passes around a sheave, 24, journaled in the upper end of the shaft 2, thence under a sheave, 25, pivoted in the bracket D, and around a sheave, 26, on the shaft or hub of the wheel C, and thence over the sheave 25 down to sheave 22. This arrangement of the belt 23 renders it automatically adjustable and of even tension, whether the shaft 2 be at its highest or lowest adjustment, and avoids the necessity of shortening or lengthening the belt when changing the adjustment of the shaft to raise and lower the guide for adapting it for thick and thin lumber to be sawed, it being understood that the guide must necessarily be raised to permit the lumber resting on the table to pass freely under the guide.

If the guide were at an elevation for thick lumber, the effectivess of the guide upon the saw, when thin lumber is substituted, would be diminished, owing to a portion of the saw-blade between the guide and lumber being free to twist and waver, for it will be understood that the walls in the cut in the lumber are auxiliary to the guide itself in preventing a lateral or wavering motion of the saw.

Actuating the gear-wheel, and with it the back-plate, 18, by means of a worm, provides for a very low velocity of the back plate as compared with the saw-band wheel, from which the plate derives its power to revolve, and at the same time dispenses with complicated gearing, not only expensive and liable to get out of order, but unnecessarily exhausting power of the machine which should be directed to the saw.

Of course my invention is not limited to the mechanism shown and described for revolving the back plate at a less velocity than the saw; but it is desirable that it should be revolved at a slow enough rate of speed consistent with the desired change of surface presented to the saw, and the friction of the plate directed laterally against the saw, by reason of the revolutions of the back plate against and the rapid longitudinal movement of the saw.

To prevent the lumber shifted about under the guide from catching on the gear-wheel, an angular plate, 27, is secured on the under side of the housing, and projects forward over and guards the teeth from any such liability.

Revolving back plates possess great advantages over the stationary ones commonly employed, for the reason that, continually presenting a new surface to the saw, the wear of the plate in radial lines is materially diminished; therefore a revolving back plate broadly considered forms an important feature of my invention, and is not limited by the special means now to be described, by which the grooving of the plate in radial or other lines is effectually avoided.

Referring to Figs. 1 and 4, it will be observed that the line of travel of the saw is at one side of the axis of the back plate, and that this line bisects the axis of the jaws and is a chord upon the circle formed by the back plate. With the saw in operation and the back plate revolving the effect of this arrangement is to continually shift the center from which the lines radiate. Hence the radiating lines will cross each other, as shown in Fig. 5, and not only effectually prevent the saw from grooving the plate, but, on the contrary, maintain the surface of the plate even and smooth, as it is gradually and necessarily worn away by the friction of the saw; and, furthermore, the back edge of the saw is prevented from an uneven wear, which it would have if the plate became grooved or uneven on its operative face.

The advantages of my invention may be understood when it is remembered that with a stationary back plate or with one revolved at intervals the saw becomes case-hardened on its back edge by reason of frictional heat, and in consequence its durability is seriously effected, and, furthermore, the grooves worn in the back plate cause the saw to twist, and prevent its effective operation.

My construction also avoids the necessity of stopping the machine to move the back plate, so that it will present an unworn surface to the saw, and also the expense and time of replacing worn back plates with new ones.

In Fig. 2 is shown a similar saw-guide and means for actuating the same precisely like the one just described, except so far as the arrangement of the belt is modified by reason of the guide being stationary so far as a vertical adjustment is concerned, and its actuation by the power-wheel of the band-saw, and the small sheave to keep the belt from contact with the felly of the drive-wheel. This lower stationary guide is an auxiliary to the upper guide and essential for effectively guiding the saw, which effectiveness is increased like and for the same reasons assigned to the upper guide, and, taken with the upper guide, renders the machine perfect in operation so far as can be attained through guiding mechanism.

To adapt the guide when the machine is used for resawing, auxiliary and larger jaws 27 (see dotted lines Fig. 4) are rigidly secured to the jaws 11 in any suitable manner.

Having thus described my invention, what I claim, and desire to secure by Letters Patent, is—

1. The combination, in a saw-guide, with the revolving back plate and means for actuating the same, of guide-jaws eccentric to said back plate, substantially as described.

2. A saw-guide consisting of a cylinder divided longitudinally for a portion of its length, so that the two sides form spring-jaws, a suitable support for the same, and mechanism for adjusting the jaws toward each other, substantially as described.

3. A saw-guide the jaws of which are formed of a single cylindrical piece of metal cored out as described, in combination with a support, and means for adjusting said jaws with reference to each other, substantially as described.

4. In a saw-guide, the combination, with the guide-jaws and support of a rotating bushing, and means for actuating the same, substantially as described.

5. In a saw-guide, the combination, with the back plates, of the bushing provided with segmental ribs overlapping and embracing said plates, and means for operating said parts, substantially as described.

6. The combination, with the revolving back plate, and means for actuating the same, of the ribbed bushing and the guide-jaws, said bushing forming a bearing for the jaws supporting the back-plate, substantially as described.

7. The combination, with the removable back plate, the gear-wheels faced by said plate, and a worm-gear, of mechanism, substantially as described, connecting said worm-gear with the shaft of the saw-band wheel to actuate the back plate, substantially as described.

8. The combination, with the shaft 2, the revolving back plate, and the power-shaft, of a belt, 23, and suitable driving-pulleys, all arranged substantially as described.

REUBEN McCHESNEY.

Witnesses:
 JNO. G. ELLIOTT,
 W. W. ELLIOTT.